United States Patent
Rigsby et al.

(10) Patent No.: US 9,121,969 B2
(45) Date of Patent: Sep. 1, 2015

(54) POWER SAVINGS MODE FOR OCEAN BOTTOM SEISMIC DATA ACQUISITION SYSTEMS

(71) Applicant: ION Geophysical Corporation, Houston, TX (US)

(72) Inventors: Timothy B. Rigsby, Richmond, TX (US); Felix E. Bircher, Metairie, LA (US)

(73) Assignee: ION GEOPHYSICAL CORPORATION, Houston, TX (US)

( * ) Notice: Subject to any disclaimer, the term of this patent is extended or adjusted under 35 U.S.C. 154(b) by 0 days.

(21) Appl. No.: 14/203,873

(22) Filed: Mar. 11, 2014

(65) Prior Publication Data

US 2014/0254315 A1    Sep. 11, 2014

Related U.S. Application Data

(60) Provisional application No. 61/775,915, filed on Mar. 11, 2013.

(51) Int. Cl.
*G01V 1/38*    (2006.01)

(52) U.S. Cl.
CPC ............ *G01V 1/3808* (2013.01); *G01V 1/3835* (2013.01)

(58) Field of Classification Search
CPC .......... G01V 1/20; G01V 1/28; G01V 1/223; G01V 1/13; G01V 1/3808; G01V 1/3535
USPC .......................................................... 367/13
See application file for complete search history.

(56) References Cited

U.S. PATENT DOCUMENTS

| 4,023,140 | A  | * | 5/1977  | Siems et al. ..................... 367/79 |
| 4,519,011 | A  | * | 5/1985  | Bowden ........................ 360/137 |
| 4,885,724 | A  | * | 12/1989 | Read et al. ...................... 367/77 |
| 5,883,856 | A  | * | 3/1999  | Carroll et al. ................... 367/13 |
| 6,414,955 | B1 | * | 7/2002  | Clare et al. .................... 370/390 |
| 2003/0117025 | A1 | * | 6/2003 | Rouquette .................... 307/147 |
| 2007/0286022 | A1 |   | 12/2007 | Bull et al. |
| 2009/0052277 | A1 | * | 2/2009 | Swanson ........................ 367/15 |
| 2009/0234585 | A1 | * | 9/2009 | Ross et al. ....................... 702/14 |
| 2009/0261968 | A1 | * | 10/2009 | El-Hamamsy et al. .... 340/539.1 |

(Continued)

FOREIGN PATENT DOCUMENTS

| WO | 0192918   | 12/2001 |
| WO | 0237140   | 5/2002  |
| WO | 2008156502 | 12/2008 |

OTHER PUBLICATIONS

United Kingdom Intellectual Property Office Search Report for SB1404278.2, dated Mar. 28, 2014, 2 pages.

(Continued)

*Primary Examiner* — Isam Alsomiri
*Assistant Examiner* — Hovhannes Baghdasaryan
(74) *Attorney, Agent, or Firm* — Dorsey & Whitney LLP

(57) ABSTRACT

Embodiments of the invention provide methods, systems, and apparatus for conserving power while conducting an ocean bottom seismic survey. Sensor nodes placed on an ocean floor may be configured to operate in at least an idle mode and an active mode. When a seismic source boat approached the sensor node, the node may adjust its mode of operation from an idle mode to an active mode. After the seismic source boat is no longer near the sensor node, the idle mode may be entered again to conserve power.

27 Claims, 9 Drawing Sheets

(56) References Cited

U.S. PATENT DOCUMENTS

| | | | |
|---|---|---|---|
| 2009/0279384 A1* | 11/2009 | Pavel | 367/14 |
| 2010/0109671 A1* | 5/2010 | Hobbs | 324/334 |
| 2010/0145622 A1* | 6/2010 | Haque et al. | 702/14 |
| 2011/0317517 A1* | 12/2011 | Borresen et al. | 367/21 |
| 2012/0294112 A1 | 11/2012 | Pearce et al. | |
| 2013/0215717 A1* | 8/2013 | Hofland et al. | 367/59 |

OTHER PUBLICATIONS

International Search Report for PCT/US2014/023086, mailed Sep. 5, 2014, 2 pages.

* cited by examiner

POWER SAVINGS MODE FOR OCEAN BOTTOM SEISMIC DATA ACQUISITION SYSTEMS

CROSS REFERENCE TO RELATED APPLICATIONS

This application claims priority to and the benefit of U.S. provisional application No. 61/775,915 entitled "Power Savings Mode for Ocean Bottom Seismic Data Acquisition Systems," which was filed on Mar. 11, 2013, and which is hereby incorporated by reference in its entirety for all purposes.

BACKGROUND OF THE INVENTION

1. Field of the Invention

The present invention generally relates to seismic data acquisition, and more specifically to ocean bottom seismic data acquisition systems.

2. Description of the Related Art

In conventional marine seismic surveying, a vessel tows a seismic source, such as an airgun array, that periodically emits acoustic energy into the water to penetrate the seabed. Sensors, such as hydrophones, geophones, and accelerometers may be housed in sensor units at sensor nodes periodically spaced along the length of an ocean bottom cable (OBC) resting on the seabed. Alternatively, a plurality of autonomous sensor nodes, each comprising one or more seismic sensors may be deployed on the seabed. The sensors of the sensor node are configured to sense acoustic energy reflected off boundaries between layers in geologic formations. Hydrophones detect acoustic pressure variations; geophones and accelerometers, which are both motion sensors, sense particle motion caused by the reflected seismic energy. Signals from these kinds of sensors are used to map the geologic formations.

The power required to operate the sensor nodes may be provided via batteries and/or power generators. For example, in OBC systems, the cable may be connected to a surface buoy or a seismic vessel comprising a generator, e.g., a diesel generator. The generator may provide power for operating the sensors either directly or indirectly (e.g., via chargeable batteries). In autonomous sensor node based system, rechargeable batteries may be included in each node to power the node.

SUMMARY OF THE INVENTION

The present invention generally relates to seismic data acquisition, and more specifically to ocean bottom seismic data acquisition systems.

One embodiment of the invention provides a method for marine seismic data collection. The method generally comprises operating a sensor node in an idle mode, wherein the idle mode is configured to conserve power consumption by the sensor node, and determining whether seismic data is expected at the sensor node. The method further comprises operating the sensor node in an active mode in response to determining that seismic data is expected, and collecting seismic data while in the active mode.

Another embodiment of the invention provides a method for conducting s seismic survey. The method generally comprises deploying a plurality of sensor nodes on a seabed, wherein the sensor nodes are initiated to operate in an idle mode, initiating operation of a seismic source boat, wherein the seismic source boat is configured to generate a signal to the sensor nodes, and selectively adjusting a mode of operation of one or more sensor nodes from the idle mode to an active mode based on a proximity of the one or more sensor nodes to the source boat, wherein the proximity is determined based on the signal.

Yet another embodiment of the invention provides an ocean bottom seismic sensor node generally comprising a processor, at least one acoustic sensor, at least one particle motion sensor, and a memory. The memory comprises a mode selection program which, when executed by the processor is configured to perform operations comprising operating the sensor node in an idle mode, wherein the idle mode is configured to reduce power consumption by the sensor node, determining whether seismic data is expected at the sensor node, in response to determining that seismic data is expected, operate the sensor node in an active mode, and collecting seismic data while in the active mode.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
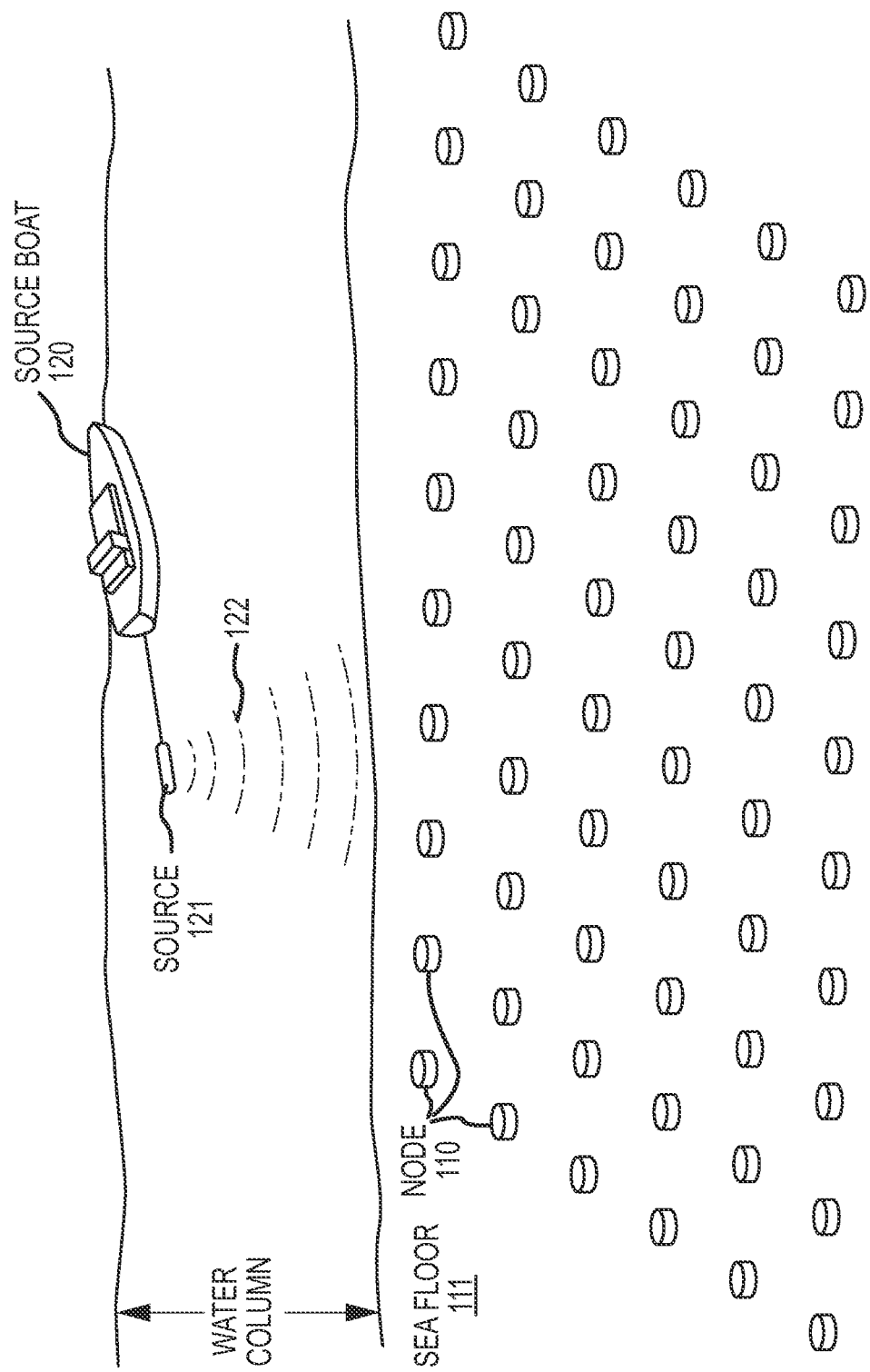
FIG. 1 is an example of a seismic survey according to an embodiment of the invention.

Embodiments of the invention provide methods, systems, and apparatus for conserving power while conducting an ocean bottom seismic survey. Sensor nodes placed on an ocean floor may be configured to operate in at least an idle mode and an active mode. When a seismic source boat approached the sensor node, the node may adjust its mode of operation from an idle mode to an active mode. After the seismic source boat is no longer near the sensor node, the idle mode may be entered again to conserve power.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computerized system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a wireless network. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates an exemplary seismic survey according to an embodiment of the invention. A plurality of autonomous sensor nodes 110 may be deployed on the seabed 111. Any reasonable means may be used to deploy the autonomous sensor nodes 110. For example, in one embodiment, the sensor nodes 110 may be deployed on the sea floor or bed using a remotely operated vehicle (ROV, not shown). Alternatively, each of the autonomous sensor nodes 110 may be attached to a rope, and deployed to the seabed directly from a boat. In yet another embodiment, each autonomous sensor node may be equipped and programmed to navigate through the water column to and from predetermined locations on the sea floor.

While reference is made to a sea floor and seabed herein, embodiments of the invention are not limited to use in a sea environment. Rather, embodiments of the invention may be used in any marine environment including oceans, lakes, rivers, etc. Accordingly, the use of the term sea, seabed, sea floor, and the like, hereinafter should be broadly understood to include all bodies of water.

Referring back to FIG. 1, a source boat 120 may be configured to tow a seismic source 121 while conducting a seismic survey. In one embodiment, the seismic source 121 may be an air gun configured to release a blast of compressed air into the water column towards the seabed 111. As shown in FIG. 1, the blast of compressed air generates seismic waves 122 which may travel down towards the seabed 111, and penetrate and/or reflect from sub-seabed surfaces. The reflections from the sub-surfaces may be recorded by the nodes 110 as seismic data, which may be thereafter processed to develop an image of the sub-surface layers. These images may be analyzed by geologists to identify areas likely to include hydrocarbons or other substances of interest.

Figure 2:
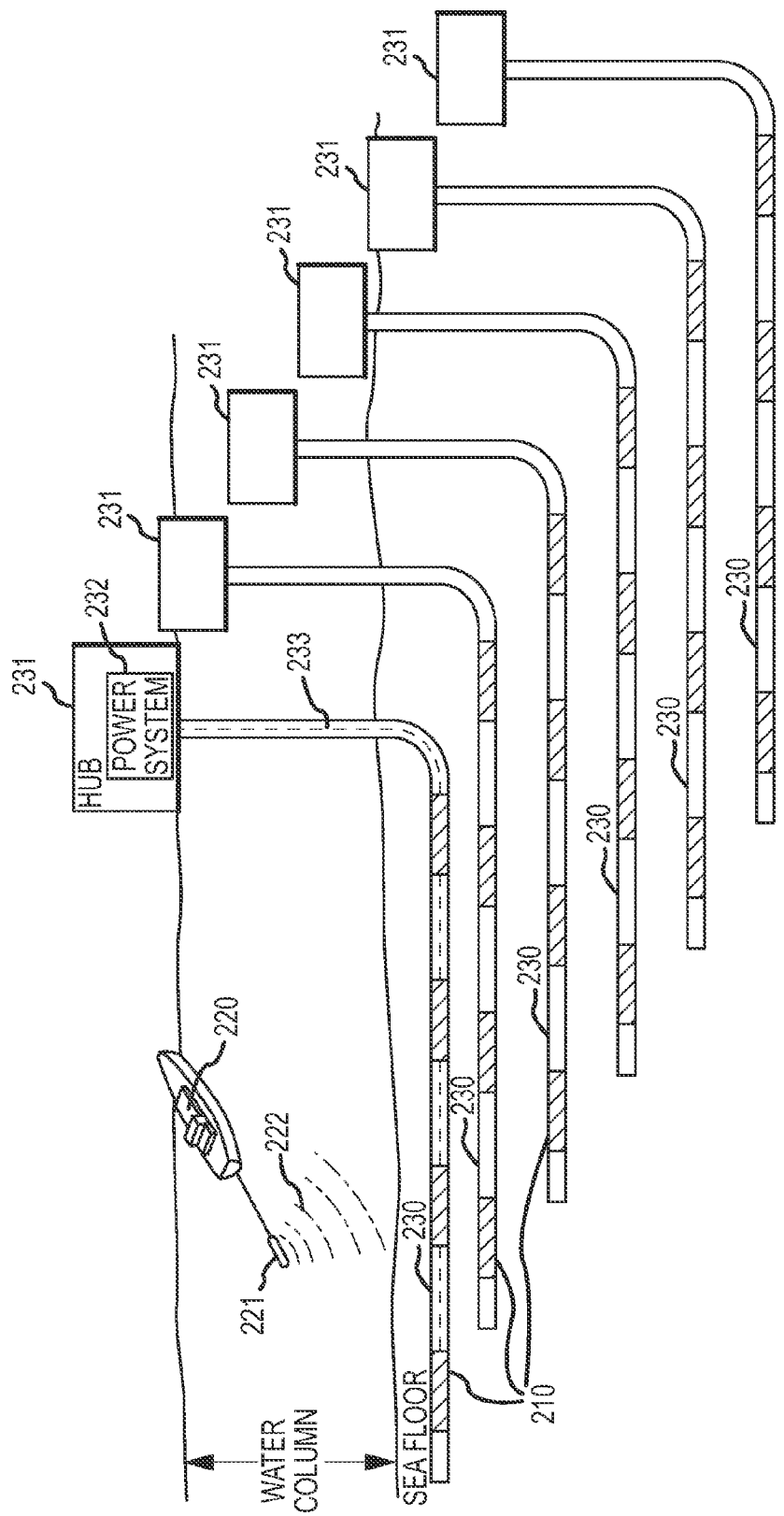
FIG. 2 is an example of a seismic survey according to another embodiment of the invention.

FIG. 2 illustrates another example of a seismic survey according to an embodiment of the invention. As illustrated in FIG. 2, a plurality of sensor nodes 210 may be placed in each of one or more ocean bottom cables (OBCs) 230. In one embodiment, the OBCs may be coupled to a respective surface buoy 231. The surface buoys may include seismic data storage systems configured store seismic data collected by the sensor nodes 210. The surface buoys 231 may also include a power system 232. The power system 232, in one embodiment, may include one or more of a generator, e.g., a diesel generator, one or more rechargeable batteries, fuel cell, and the like.

A cable 233 may be included in each of the OBCs 230 for transferring power, data, instructions, and the like from the surface buoy 231 to the sensor nodes 210 in the OBC. In one embodiment, the cable 233 may include a plurality of transmission lines. For example, a first plurality of transmission lines may be configured to transfer data between the sensor nodes and the buoy 231, a second plurality of data lines may be configured to transfer instructions between the sensor nodes and the buoy 231, and a third one or more transmission lines may transfer power from the buoy 231 to the sensor nodes. In alternative embodiments, the same set of transmission line or lines may be used to transfer one or more of seismic data, instructions, and/or power. Moreover, while a single cable 233 is referred to herein, in alternative embodiments, a plurality of cable segments may be included to transfer the seismic data, instructions, and power between the sensor nodes 210 and respective buoy 231.

In one embodiment of the invention, the sensor nodes 210 may be coupled to each other serially. Therefore, each node may be configured to receive and transfer instructions, data, power, etc. from a first node to a second node. In an alternative embodiment, the sensor nodes 210 may be connected in parallel via the cable 233. In other words, each sensor node 210 may be directly coupled to the surface buoy 231 via the cable 233. In other embodiments, the sensor nodes may be connected in any combination of serial and parallel connections with respect to each other, and direct and indirect coupling with the surface buoy.

In FIG. 2, while each cable 230 is shown to be coupled with its own respective surface buoy 231 in FIG. 2, in alternative embodiments, multiple cables 230 may be coupled to a single buoy 231. In other embodiments of the invention, the surface buoys 231 may be omitted, and the cables 230 may be coupled to a recording boat, which may include recording and power generation equipment to support the sensor nodes 210.

FIG. 2 further illustrates a source boat 220, seismic source 221, and seismic waves 222 which correspond to the source boat 120, seismic source 121, and seismic waves 122, respectively. While a single source 121 and 221 is shown in each of FIGS. 1 and 2, in alternative embodiments, a plurality of sources may be used while conducting a seismic survey. When a plurality of sources is used, the sources may be arranged in a source array that is towed behind the source boat.

While the sensor nodes 210 are depicted as being enclosed within an ocean bottom cable skin, in alternative embodiments, the sensor nodes 210 may not be enclosed as shown. In such alternative embodiments, the sensor nodes may be independent distinct devices exposed to the water, and may be strung together via a single cable or cable segments. Accordingly, reference to the term "ocean bottom cable" herein refers to any reasonable arrangement of sensor nodes wherein a plurality of sensor nodes are physically coupled to each other, whether or not they are enclosed in a cable skin.

Figure 3:
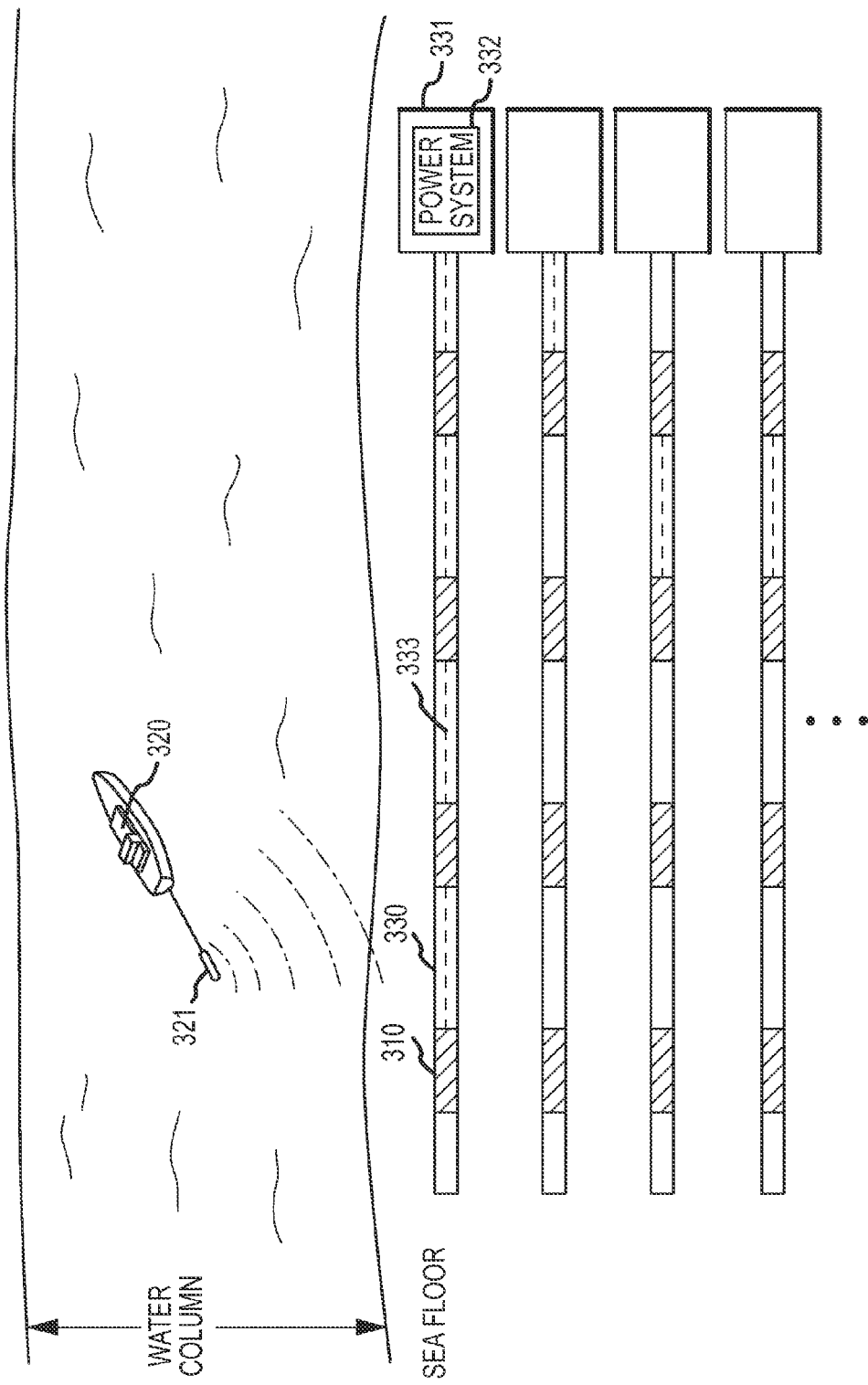
FIG. 3 is yet another example of a seismic survey according to an embodiment of the invention.

FIG. 3 illustrates yet another embodiment of the invention. Similar to FIG. 2, the seismic survey shown in FIG. 3 may also include a source boat 320 towing one or more seismic sources 321 and a plurality of ocean bottom cables 330, each comprising a plurality of nodes 310. In contrast to FIG. 2, however, the ocean bottom cables 330 may be coupled to a sub-sea hub 331 instead of a surface buoy. In one embodiment, as shown in FIG. 3, the sub-sea hub 331 may be placed on the sea floor. Alternatively, in other embodiments, the sub-sea hub may be configured to float at a predefined distance above the sea floor or a predefined distance below the water surface. The use of sub-sea hubs 330 may be particularly advantageous in environments such as the arctic, where the sea surface may be frozen and/or may include moving masses of ice which may crash into and destroy surface buoys.

As in the case of the surface buoy 231 of FIG. 2, the sub-sea hub 331 also includes a power system 332 (which is similar to the power system 232), and power cable 333 (which is similar to the power cable 233) for providing power to the nodes 310.

Figure 4:
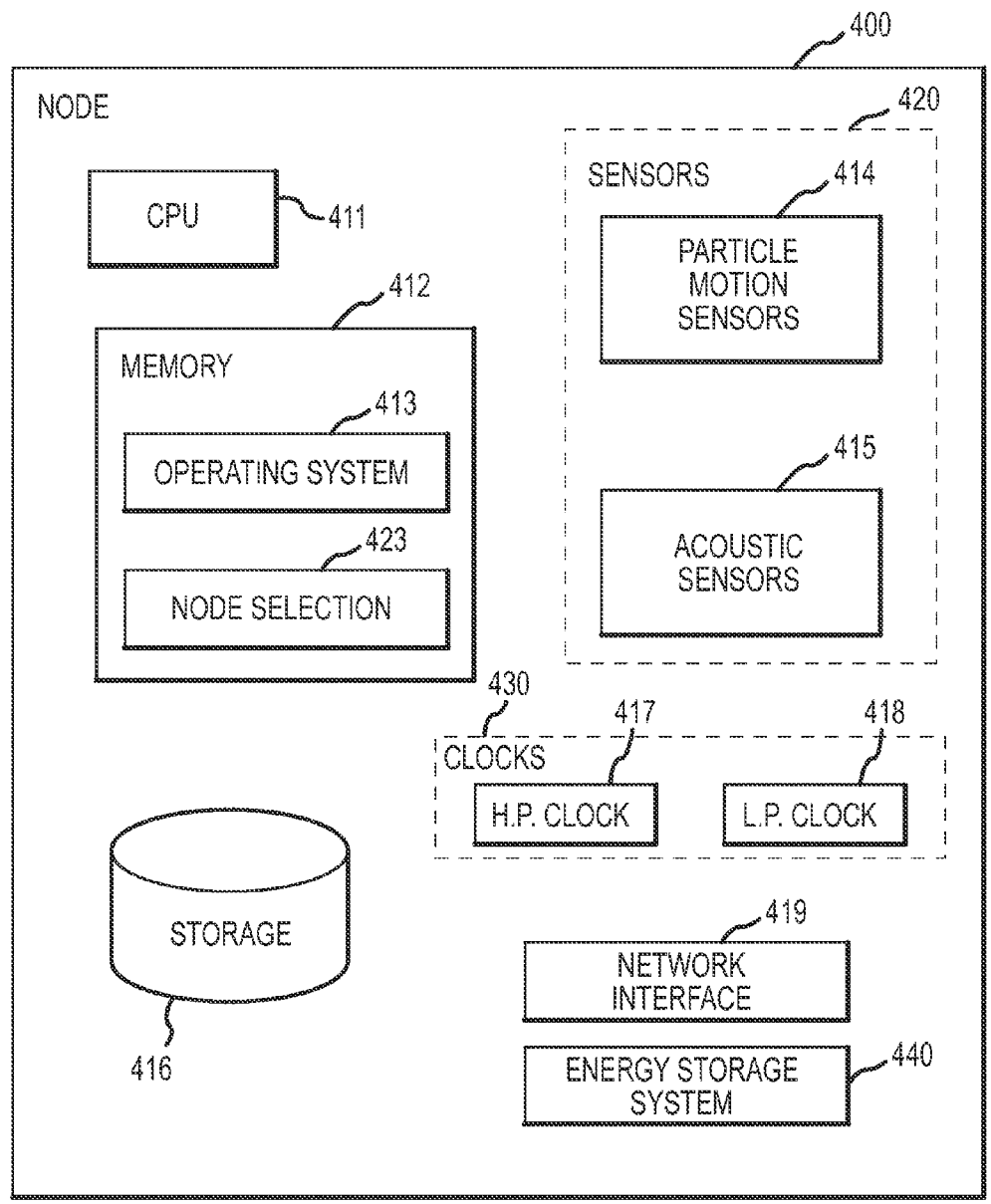
FIG. 4 illustrates a sensor node according to an embodiment of the invention.

FIG. 4 illustrates a mode detailed view of a sensor node 400 according to an embodiment of the invention. The sensor node may be an example of any one of the sensor nodes 110, 210, and 310 illustrated respectively in FIGS. 1, 2, and 3, but is not limited to those embodiments. As illustrated in FIG. 4, the sensor node 400 may include a Central Processing Unit (CPU) 411, a memory 412, one or more seismic sensors 420, storage 416, one or more clocks 430, and a network interface device 419, and an energy storage system 440. While a single CPU 411 is shown in FIG. 4, in alternative embodiments, a plurality of CPUs may be implemented within the node 400.

The network interface device 419 may be any entry/exit device configured to allow network communications between the sensor node 400 and another device, e.g., another sensor node, surface buoy, or sea-bed hub, or the like, via a network, e.g., a wireless network, the cables 233 and 333 shown in FIGS. 2 and 3, or the like. In one embodiment, the network interface device 419 may be a network adapter or other network interface card (NIC).

Storage 416 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 412 and storage 416 could be part of one virtual address space spanning multiple primary and secondary storage devices.

The seismic sensors 420 may be configured to record seismic signals. In one embodiment, the seismic sensors may include one or more particle motion sensors 414 and one or more acoustic sensors 415, as illustrated in FIG. 4. The acoustic sensors 415 may be configured to measure a pressure wavefield. In one embodiment, the acoustic sensor may be a hydrophone. The particle motion sensors may be configured to detect at least one component of particle motion associated with an acoustic signal. Examples of particle motion sensors include geophones, particle displacement sensors, particle velocity sensors, accelerometers, or combinations thereof.

The clocks 430 may be utilized to determine the arrival times of various acoustic signals. As illustrated in FIG. 4, the clocks 430 may include a high precision clock 417 and a low precision clock 418, according to one embodiment. The high precision clock 417 may be used to operate the sensor node in an acquisition or active mode, and the low precision clock 418 may be used to operate the device in an idle or sleep or power savings mode, as will be described in greater detail below.

The energy storage system 440 may be configured to power operation of the sensor node 400. In one embodiment, the energy storage system 440 may be a rechargeable battery system including one or more batteries made from, e.g., nickel-cadmium (NiCd), nickel-zinc (NiZn), nickel metal hydride (NiMH), and/or lithium-ion (Li-ion) based cells. In an alternative embodiment, the energy storage system may include a fuel cell. Exemplary fuels that may be used as fuel in the fuel cell include hydrogen, hydrocarbons such as natural gas or diesel, and alcohols such as methanol. In some embodiments, a combination of different types of energy storage systems may be integrated within the energy storage system 440 to power the sensor node 400.

In one embodiment of the invention, the energy storage system may be replenished from an external source. For example, in a battery based energy storage included in an OBC embodiment, a cable (e.g., the cables 233 and 333) may be used to recharge the energy storage system periodically.

The memory 412 is preferably a random access memory sufficiently large to hold the necessary programming and data structures of the invention. While memory 412 is shown as a single entity, it should be understood that memory 412 may in fact comprise a plurality of modules, and that memory 412 may exist at multiple levels, from high speed registers and caches to lower speed but larger DRAM chips.

Illustratively, the memory 412 contains an operating system 413. Illustrative operating systems, which may be used to advantage, include Linux (Linux is a trademark of Linus Torvalds in the US, other countries, or both). More generally, any operating system supporting the functions disclosed herein may be used.

Memory 412 is also shown containing a mode selection program 423 which, when executed by CPU 411, provides support selecting an operating mode for the sensor node 400. For example, the mode selection program 423 may be configured to determine a predefined mode selected from a set of predefined operating modes to operate the sensor node. Exemplary operating modes may include an active or operating mode and a sleep or idle or power savings mode, as will be described in greater detail below. While the mode selection program 423 is shown as being separate from the operating system 413 in FIG. 4, in alternative embodiments, the mode selection program 423 may be a part of the operating system or another program.

Figure 5:
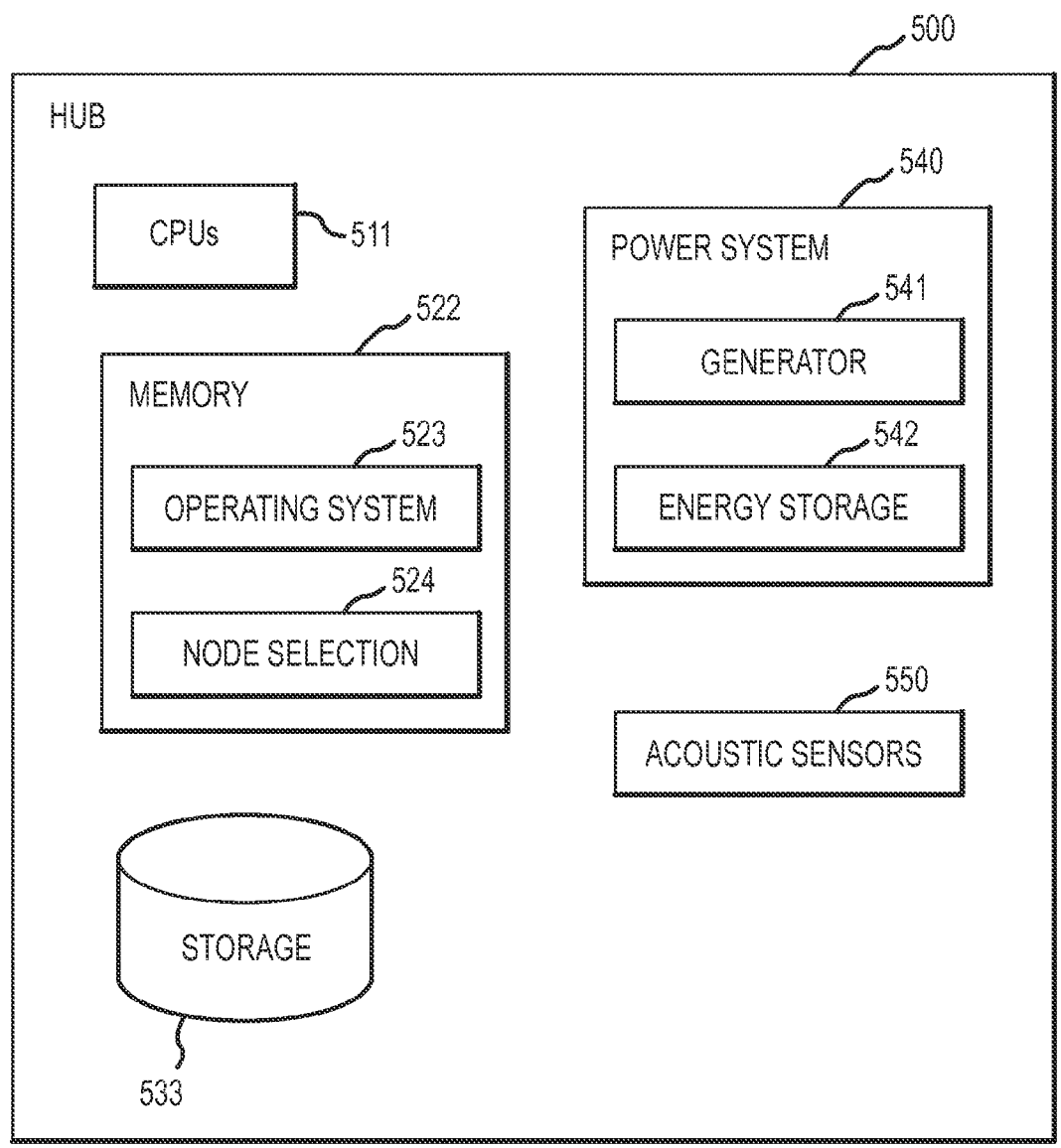
FIG. 5 illustrates a hub device according to an embodiment of the invention.

FIG. 5 is an example of an exemplary hub device 500, according to an embodiment of the invention. The hub device 500 may be an example of the surface buoy 231 of FIG. 2 and the sea-bed hub 331 of FIG. 3. The hub 500 may be physically arranged in a manner similar to the sensor node 400. Accordingly, the hub 500 is shown generally comprising one or more CPUs 511, a memory 522, and a storage device 533.

Memory 522 may be a random access memory sufficiently large to hold the necessary programming and data structures that are located on the hub 500. As shown in FIG. 5, the memory 522 may include an operating system 523 and a node selection program 524. In one embodiment, the node selection program 524 may be configured to instruct one or more sensor nodes associated with the hub device to enter into one of a predefined set of operating modes, as will be described in greater detail below.

The hub 500 may also include a power system 540. As illustrated in FIG. 5, the power system 540 may include a power generator 541 and an energy storage system 542. The energy storage system 542 may be similar to the energy storage system 440 of FIG. 4, and may include, e.g., one or more batteries. The power generator can be any type of power generator, for example, a diesel generator, fuel cell, solar panels, and the like. In general, the power generated by the generator 541 and/or the power stored in the energy storage system 542 may be supplied to one or more sensor nodes. For example, the sensor nodes may be configured to operate based on such supplied power, in one embodiment. Alternatively, such supplied power may be used to recharge the energy storage system 440 within the sensor nodes.

In one embodiment, the hub 500 may include one or more acoustic sensors 550. The acoustic sensors 550 may facilitate communications between the hub 500 and a source boat, as will be described in greater detail below.

Referring back to the seismic surveys illustrated in FIGS. 1-3, the total area of the sea floor that may be covered by survey operations may expand for several hundreds, if not thousands, of square miles. Deploying autonomous sensor nodes and/or ocean bottom cables on the sea floor may be a task that takes several days, if not weeks. The actual survey and seismic data collection itself may continue for several months. Furthermore, events such as bad weather, malfunctions in the sensor node deployment systems, and the like can introduce heavy delays which may last several days in some instances.

Given the large amount of time that the sensor nodes may have to remain on the ocean bottom, it is critical that there is sufficient power to operate the sensor nodes while they are on the sea floor. However, the total available power in the energy storage and generation systems of the sensor nodes and hubs may only be sufficient to operate the sensor nodes for a few short weeks. Embodiments of the invention provide methods, systems, and apparatus for efficiently using the available power so that the life of the sensor nodes is extended while they are on the ocean floor.

In one embodiment of the invention, the sensor nodes may be configured to operate in one of a plurality of predefined operating modes. For example, one mode of operation may include an active mode. In the active mode, all or most of the components of the sensor node may be fully powered. The active mode may be entered at a time when seismic data collection is expected.

The sensor nodes may also be configured to operate in a sleep/idle/power savings mode (hereinafter referred to simply as idle mode). In the idle mode, the sensor node may be configured to turn off power to one or more devices and/or operate certain devices in a low power mode. For example, referring back to FIG. 4, the mode selection program 423 may be configured to cause the CPU 411 to enter a power savings mode of operation while in the idle mode. In one embodiment, operating the CPU 411 in the low power mode may involve dynamic voltage scaling and/or dynamic frequency scaling, which may alter the CPU core voltage and/or the clock rate, thereby decreasing power consumption by the CPU. In general, any technique that can reduce power consumption by the CPU may be implemented to reduce the overall power consumption.

In one embodiment, the mode selection program 423 may be configured to select a particular clock for operating the node 400 based on the mode. For example, in the active mode, the mode selection program may select the high precision clock 417 to operate the node 400. This may be done because, in the active mode, seismic data collection may be in progress, and therefore it may be desirable to use a clock with greater precision. However, because the high precision clock 41 may operate at greater frequencies, it may consume more power than the low precision clock. Accordingly, when in the idle mode, the mode selection program 423 may cause the low precision clock to be selected for operating the node 400.

In one embodiment, the mode selection program 423 may be configured to shut off power to one or more devices of the node 400 based on the mode of operation. For example, the idle mode is entered when seismic data collection is not expected. Accordingly, one or more devices used necessary for seismic data collection may be powered off. For example, in one embodiment, the power to the particle motion sensors may be shut off in the idle mode, thereby significantly saving power usage by the node 400. In one embodiment, the power to the storage device 416 may also be shut off in the idle mode because seismic data collection and storage is not expected.

By selectively shutting off power to certain devices of the node 400 and/or operating certain devices in a low power mode while in an idle mode, embodiments of the invention greatly reduce power consumption by the node, thereby significantly extending the node's life on the sea floor during seismic data collection.

Figure 6:
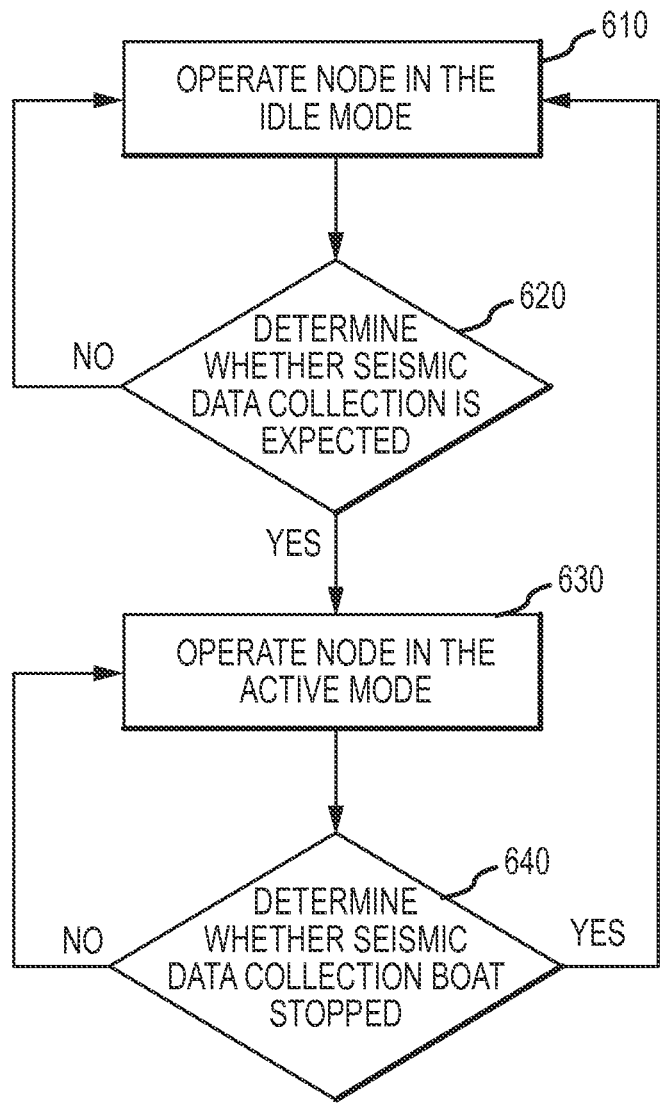
FIG. 6 is a flow diagram of exemplary operations performed by a sensor node, according to an embodiment of the invention.

FIG. 6 is a flow diagram of exemplary operations that may be performed by the mode selection program 423, according to an embodiment of the invention. The operations may begin in step 610 by operating the node 400 in an idle mode. As discussed above, operating the node 400 in an idle mode may involve shutting off power to one or more devices of the node and/or operating one or mode devices in a power savings mode. In step 620, the mode selection program may determine whether seismic data collection is expected to occur.

If, in step 620, it is determined that seismic data collection is expected to occur, then the mode selection program may operate the node in an active mode, in step 630. As discussed above, operating the node in an active mode may involve powering most, if not all devices within the node. Furthermore, in the active mode, reducing power consumption may not necessarily be a priority. Accordingly, node devices that were previously in a low power consumption node may be allowed to operate in higher power consumption modes. For example, the CPU 411 may be operated at the highest power setting, the high precision clock 417 may be used in place of the low precision clock 418, and the like.

If, on the other hand, it is determined that seismic data collection is not expected in step 620, then the mode selection program may maintain the node in the idle mode (step 610), as illustrated in FIG. 6.

In step 630, the mode selection program may determine whether seismic data collection has stopped. If it is determined that seismic data collection has stopped, the operations may proceed to step 610, where the node is operated in the power savings mode by the mode selection program 423. On the other hand, if it is determined that seismic data collection has not stopped, then the mode selection program may continue to operate the node in the active mode, as illustrated in FIG. 6.

Determining whether seismic data collection is expected (step 620 of FIG. 6) may involve communications between one or more of the sensor nodes, a seismic source boat, and/or a hub device (e.g., the surface buoy 231 and sea-bed hub 331).

For example, in one embodiment, the sensor nodes may be configured to receive a first signal directly from an approaching source boat. Upon detecting the first signal, node selection program 423 of the node may determine that seismic data collection is expected.

In an alternative embodiment, a hub device (e.g., the hub 500 of FIG. 5) may be configured to receive the first signal from the source boat. Upon detecting the first signal, the hub device may transfer a second signal to one or more sensor nodes associated with the hub device. The second signal may be transferred to the one or more associated nodes via, for example, a cable connecting the hub device to the one or more sensor nodes (e.g., the cables 233 and 333). In other embodiments, the second signal may be an electromagnetic signal or an acoustic signal that is recognized by the one or more associated sensor nodes. Upon receiving the second signal, the node selection program 423 of the sensor node may determine that seismic data collection is expected.

In one embodiment of the invention, the first signal transferred from the source boat to the sensor nodes or the hub device may be an acoustic signal. The acoustic signal may be generated by one or more source devices that are towed by the source boat, according to one embodiment. The sensor nodes and/or the hub device may be configured to receive the acoustic signal and determine that the signal was generated by a source boat. In other words, the sensor nodes and/or hub device may distinguish signals received from a source boat from other noise such as ambient noise, noise from marine animals splashing in the water, noise from nearby drilling operations and the like.

In one embodiment, the acoustic sensors in the sensor node and the hub device may be actively receiving signals even when in the idle mode, thereby allowing them to receive acoustic signals from the source boat. While operating acoustic sensors in the idle mode is described as an example herein, in alternative embodiments any type of sensor may be operated to receive signals from the source boat. In general, less than all the available sensors are operated so that power savings are achieved while simultaneously maintaining the ability to receive communication from a source boat.

Figure 7A:
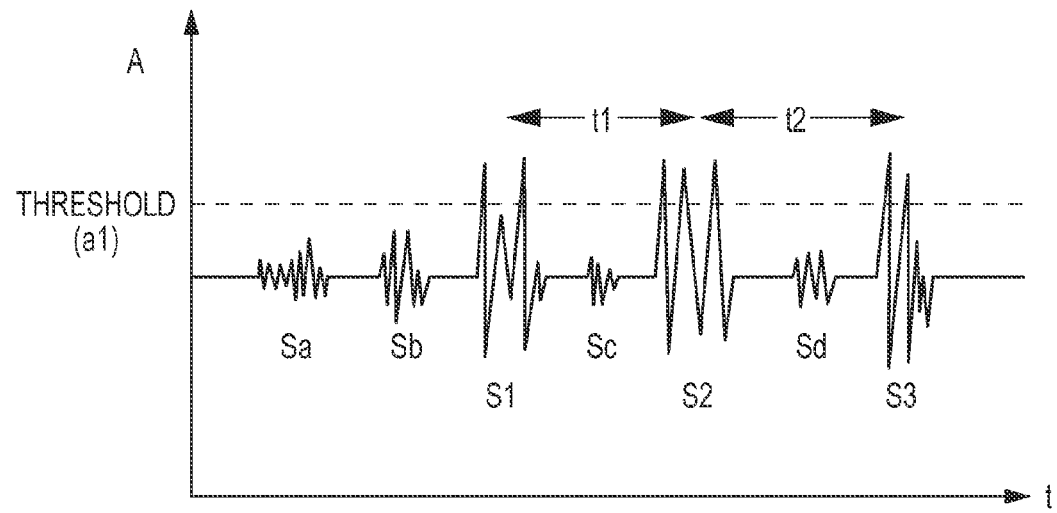
FIGS. 7A-7B illustrate exemplary output from an acoustic sensor, according to an embodiment of the invention.
Figure 7B:
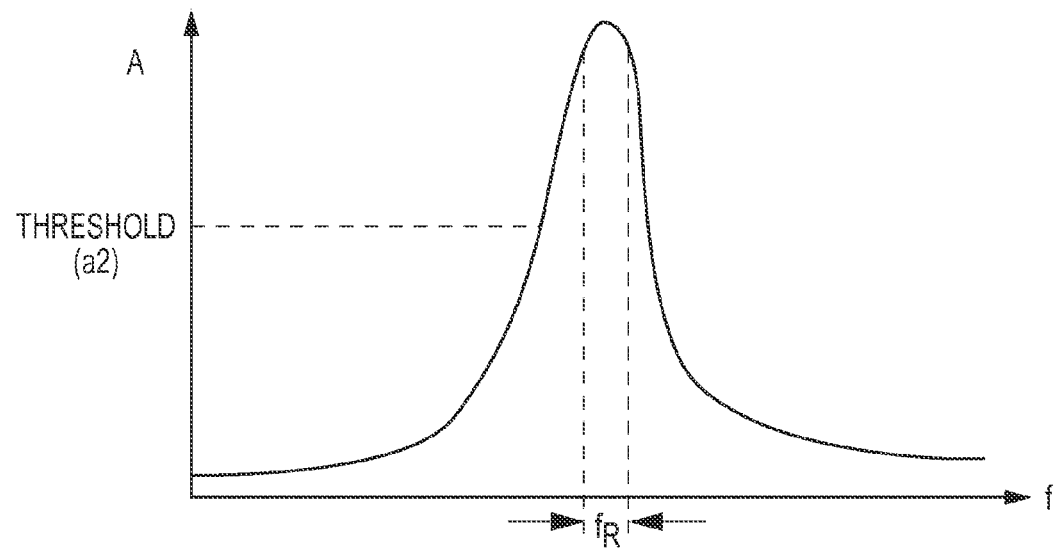

FIGS. 7A and 7B illustrate exemplary output of an acoustic sensor, which may be used to identify signals from a source boat. FIG. 7A illustrates the sensor output as amplitude (A) as a function of time (t). In one embodiment, a signal may be identified as a signal from source boat only if the signal is above a predefined threshold amplitude a1 shown in FIG. 7A. For example, the signals Sa and Sb in FIG. 7A are below the threshold a1, and therefore may be disregarded as noise. Signal S1, on the other hand is above the predefined threshold a1, and therefore may be recognized as a signal from a source boat.

In some embodiments, to further remove the possibility of noise encroachment, the sensor nodes and/or the hub devices may be configured to determine whether a predefined signal sequence has been received. For example, referring to FIG. 7A, a signal S2 is received after a time period of about t1 after the signal S1, and a signal S3 is received after a time period of about t2 after the signal S2. The sensor nodes and/or hub devices may be configured to identify predefined sequence of signals with predefined separation, duration, frequency, and the like to determine whether the signal is received from a source boat, thereby preventing the nodes from being activated in response to noise.

FIG. 7B illustrates the output of an acoustic sensor as amplitude (A) as a function of frequency (f). In one embodiment, the sensor nodes and/or hub devices may be configured to determine whether a signal is greater than a predefined amplitude threshold a2 and that it falls within a predefined frequency range Fr. If the thresholds for amplitude and frequency are met, the signal may be identified as a signal from a source boat.

The signal detection techniques described herein are provided for illustrative purposes only. More generally any technique for correlating a signal to a source using, for example, a combination of amplitude thresholds, frequency ranges, predefined sequences, and the like may be used to distinguish source boat signals from noise. Furthermore, while acoustic signals are described as the means for communication between the source boat and nodes/hub devices, in alternative embodiments, any other type of signal including electromagnetic signals may be used for communication using similar techniques for distinguishing noise.

Referring back to step 640 in FIG. 6, determining that seismic data acquisition has stopped may involve determining that a source boat is no longer active near the sensor node (or hub device). One way to determine this may be by determining whether a predefined period of time has passed since receiving an acoustic signal having predefined characteristics, e.g., frequency range, amplitude, regularity, and the like.

Figure 8:
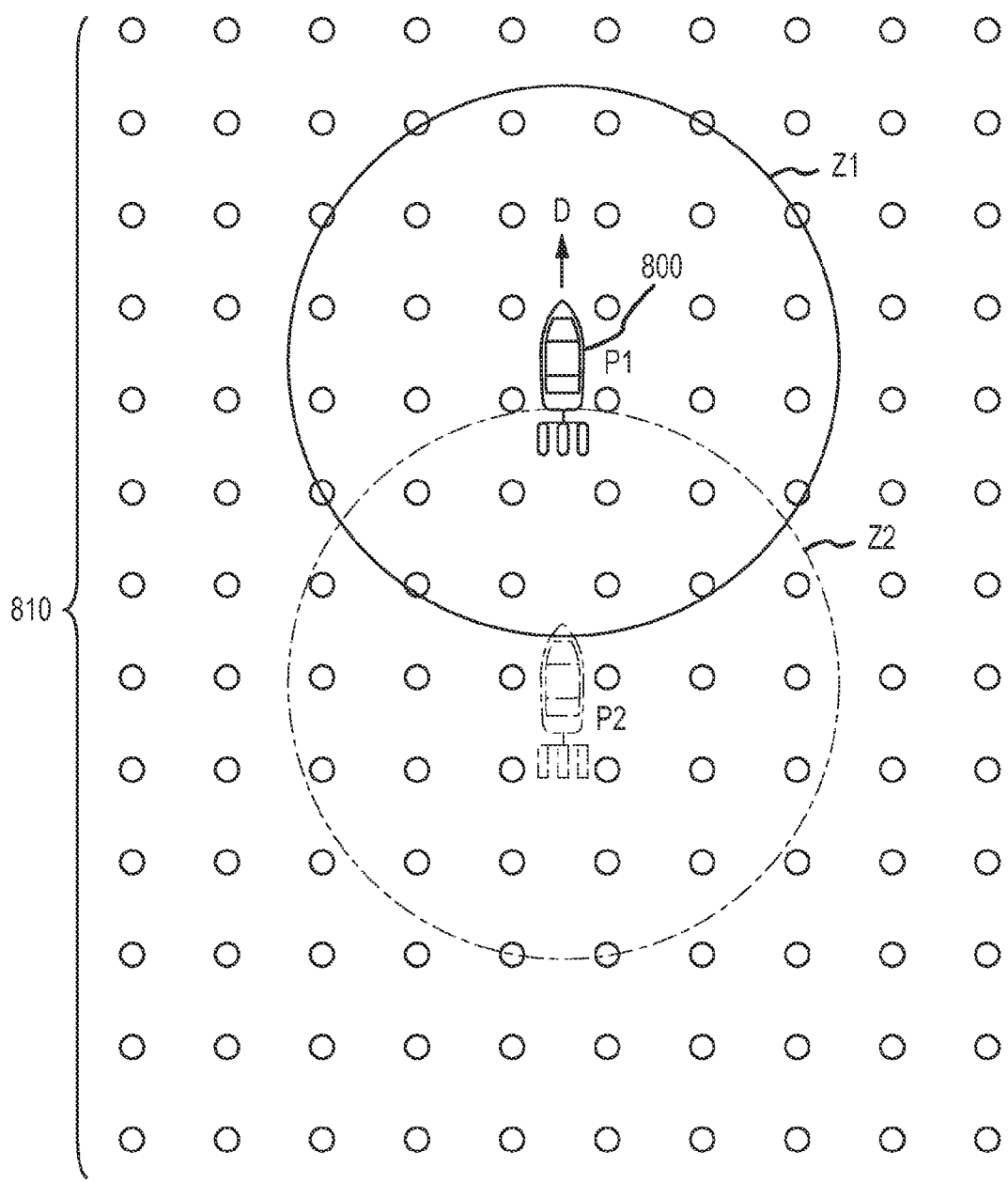
FIG. 8 illustrates a plan view of a seismic survey according to an embodiment of the invention.

FIG. 8 is a plan view of an exemplary seismic survey according to an embodiment of the invention. As illustrated a seismic source boat 800 is shown traveling in a direction D over an array of sensor nodes 810. At the current position P1 of the source boat 800, a plurality of nodes within the zone Z1 represented by the solid circle may be in the active mode for collecting seismic data. In other words, all nodes within a predefined radius of the source boat may be in the active mode. All the nodes completely outside the zone Z1 may be in the idle mode. In one embodiment, the radius of zone Z1 may represent the distance to which the first signal from the source boat to the sensor nodes and/or hub device can be reasonably communicated.

FIG. 8 also illustrates a previous position P2 of the boat 800 and the previous active zone Z2. As can be seen in FIG. 8, the active zone, or the zone in which the sensor nodes are in the active mode, can be thought of as sliding along with the source boat. While a circular active zone is shown in FIG. 8, in alternative embodiments, the active zone may have any other shape, whether regular or not. In general, whether a given sensor node is in the active node or not may be a function of the proximity of the sensor node and/or hub device to the source boat.

Figure 9:
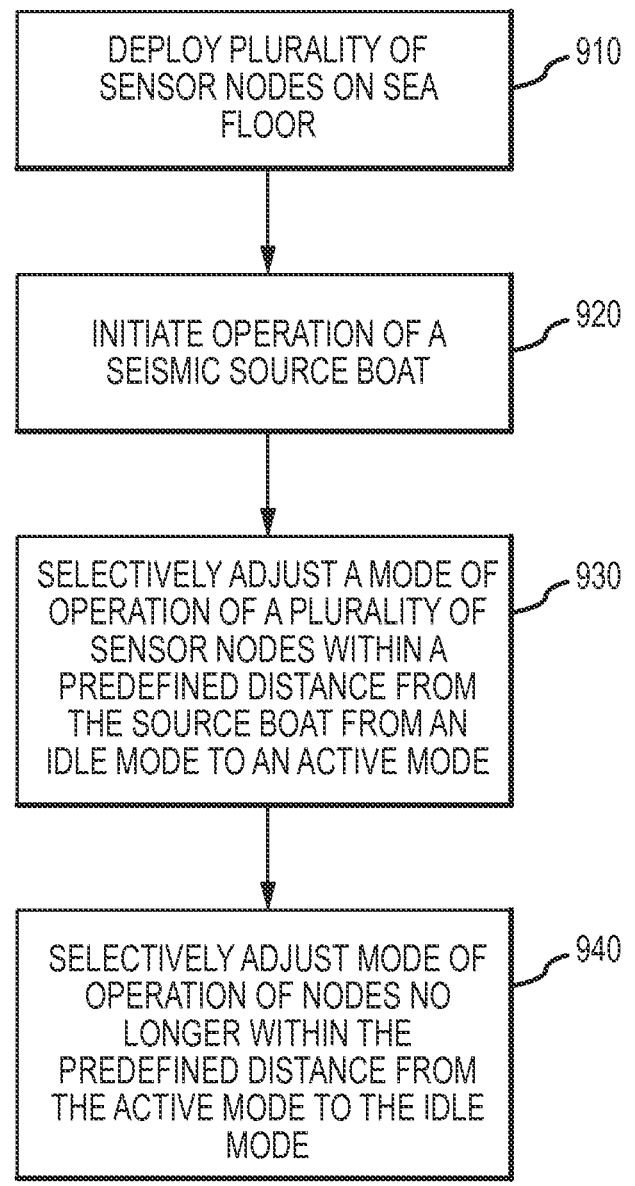
FIG. 9 is a flow diagram of exemplary operations performed while conducting a seismic survey according to an embodiment of the invention.

FIG. 9 is a flow diagram of exemplary operations performed while conducting a seismic survey according to an embodiment of the invention. The operations may begin in step 910 by deploying a plurality of sensor nodes on the sea floor, wherein the sensor nodes are initiated in an idle mode. In step 920, seismic data acquisition may be initiated by operating a seismic source boat. In step 930, as the source boat travels, a plurality of sensor nodes within a predefined distance of the source boat may be selectively adjusted to operate in the active mode to facilitate seismic data collection. In step 940, as the source boat travels, sensor nodes that are no longer within a predefined distance from the source boat may be adjusted to operate in the idle mode.

While the foregoing is directed to embodiments of the present invention, other and further embodiments of the invention may be devised without departing from the basic scope thereof, and the scope thereof is determined by the claims that follow.

What is claimed is:

1. A method for marine seismic data collection, comprising:
    operating an array of autonomous sensor nodes in an idle mode, wherein the idle mode is configured to conserve power consumption by the sensor nodes;
    determining whether seismic data is expected at one or more of the sensor nodes in the array based on proximity to a seismic source boat configured to generate a signal to the sensor nodes, wherein the proximity is determined within a predefined distance of the seismic source boat based on the signal received from the seismic source boat;
    in response to determining that seismic data is expected, selectively operating the one or more sensor nodes in an active mode; and
    collecting the seismic data with the one or more sensor nodes while selectively operating in the active mode, wherein sensor nodes within the predefined distance of the seismic source boat are operating in the active mode and other sensor nodes in the array are operating in the idle mode.

2. The method of claim 1, further comprising:
    determining whether the seismic data is no longer expected at the one or more nodes; and
    in response to determining that the seismic data is no longer expected, operating the one or more sensor nodes in the idle mode.

3. The method of claim 1, wherein operating the array of sensor nodes in the idle mode comprises operating one or more devices of the sensor nodes in a low power mode.

4. The method of claim 1, wherein operating the array of sensor nodes in the idle mode comprises shutting off power to one or more devices of the sensor nodes.

5. The method of claim 1, wherein determining whether seismic data is expected at the one or more sensor nodes comprises receiving the signal from the seismic source boat as a first signal at a hub device associated with the one or more sensor nodes, the first signal indicating the approaching seismic source boat, and further comprising transferring a second signal to the one or more sensor nodes associated with the hub device, wherein it is determined that the seismic data is expected.

6. The method of claim 5, wherein the first signal is defined by a predefined signal sequence, wherein the hub device is configured to identify the predefined signal sequence and to determine that the predefined signal sequence has been received from the source boat, thereby preventing the nodes from being activated in response to ambient noise.

7. The method of claim 5 wherein the first signal is an acoustic signal from the seismic source boat and the second signal is received from the hub device and recognized by the one or more sensor nodes associated with the hub device.

8. The method of claim 7, wherein operating in the idle mode comprises operating at least one acoustic sensor on the hub device associated with the one or more sensor nodes to detect the acoustic signal from the seismic source boat.

9. The method of claim 1, wherein each of the one or more sensor nodes is an autonomous ocean bottom node selectively operating in an active zone of the array, and wherein sensor nodes outside the active zone operate in the idle mode.

10. The method of claim 9, wherein each of the one or more autonomous sensor nodes is configured to navigate through a water column to a predetermined location on the ocean bottom.

11. The method of claim 1, further comprising selectively adjusting the active mode of one or more sensors to the idle mode based on determining that the signal has not been received from the seismic source boat for a predefined period of time.

12. A method for conducting seismic surveys, comprising:
    deploying a plurality of autonomous sensor nodes on a seabed, wherein the sensor nodes are initiated to operate in an idle mode;
    initiating operation of a seismic source boat, wherein the seismic source boat is configured to generate a signal to the sensor nodes; and
    selectively adjusting a mode of operation of one or more of the sensor nodes from the idle mode to an active mode based on a proximity of the one or more sensor nodes to the seismic source boat, wherein the proximity of the one or more sensor nodes is determined within a predefined distance of the seismic source boat based on the signal received from the seismic source boat and sensor nodes within the predefined distance of the seismic source boat are in the active mode; and
    adjusting other sensor nodes no longer within the predefined distance from the seismic source boat to operate in the idle mode.

13. The method of claim 12, further comprising selectively adjusting the mode of operation of the one or more sensor nodes from the active mode to the idle mode based on the proximity of the one or more sensor nodes no longer being within the predefined distance from the seismic source boat.

14. The method of claim 13, wherein selectively adjusting the mode of operation from the active mode to the idle mode comprises determining that the signal has not been received from the seismic source boat for a predefined period of time.

15. The method of claim 12, wherein operating the plurality of sensor nodes in the idle mode comprises operating one or more devices of the sensor nodes in a low power mode.

16. The method of claim 12, wherein operating the plurality of sensor nodes in the idle mode comprises shutting off power to one or mode devices of the sensor nodes.

17. An autonomous ocean bottom seismic sensor node, comprising:
    a processor;
    at least one acoustic sensor;
    at least one particle motion sensor; and
    a memory comprising a mode selection program which, when executed by the processor is configured to perform operations comprising:
        operating the sensor node in an idle mode, wherein the idle mode is configured to reduce power consumption by the sensor node;
        determining whether seismic data is expected at the sensor node based on proximity to a seismic source boat configured to generate a signal to the sensor node, wherein the proximity is determined within a predefined distance of the seismic source boat based on the signal received from the seismic source boat;
        in response to determining that seismic data is expected at the sensor node:
            operating the sensor node in an active mode; and
            collecting seismic data while in the active mode;
        wherein the sensor node is configured to selectively operate in the active mode to collect the seismic data in an active zone of an array, wherein all sensor nodes in the active zone of the array operate in the active mode and other sensor nodes in the array outside the active zone operate in the idle mode.

18. The sensor node of claim 17, wherein the mode selection program is further configured, when executed by the processor, to:

determine whether seismic data is no longer expected at the node; and in response to determining that seismic data is no longer expected, operate the sensor node in the idle mode.

19. The sensor node of claim 17, wherein operating in the idle mode comprises operating the processor in a low power mode.

20. The sensor node of claim 17, wherein operating in the idle mode comprises shutting off power to the at least one particle motion sensor.

21. The sensor node of claim 17, wherein determining whether seismic data is expected at the sensor node comprises receiving the signal from the seismic source boat as a first signal at a hub device associated with the node, the signal indicating the approaching seismic source boat, and further comprising transferring a second signal to the sensor node, wherein it is determined that the seismic data is expected.

22. The sensor node of claim 21, wherein the first signal is defined by a predefined signal sequence, wherein the hub device is configured to identify the predefined signal sequence and to determine that the predefined signal sequence has been received from the source boat, thereby preventing the nodes from being activated in response to ambient noise.

23. The sensor node of claim 21 wherein the first signal is an acoustic signal received from the seismic source boat and the second signal is transferred from the hub via a cable connecting the hub device to the sensor node.

24. The sensor node of claim 23, wherein operating in the idle mode comprises operating at least one acoustic sensor of the hub device to detect the acoustic signal from the seismic source boat.

25. The sensor node of claim 17, wherein the sensor node is an autonomous ocean bottom node configured to navigate through a water column to a predetermined location on the ocean bottom.

26. The sensor node of claim 17, wherein the sensor node is a part of an ocean bottom cable comprising a hub device associated with the sensor node.

27. The sensor node of claim 17, wherein the sensor node is configured to selectively adjust from the active mode to the idle mode based on determining that the signal has not been received from the seismic source boat for a predefined period of time.

* * * * *